(12) United States Patent
Lee et al.

(10) Patent No.: US 8,641,073 B2
(45) Date of Patent: Feb. 4, 2014

(54) APPARATUS FOR ADJUSTING THE HEIGHT OF A SADDLE FOR A BICYCLE

(76) Inventors: Chang-Yong Lee, Gyeonggi-do (KR);
Jung-Uk Park, Busan (KR); Kyung-Il Jung, Seoul (KR)

( * ) Notice: Subject to any disclaimer, the term of this patent is extended or adjusted under 35 U.S.C. 154(b) by 0 days.

(21) Appl. No.: 13/511,838

(22) PCT Filed: Nov. 25, 2010

(86) PCT No.: PCT/KR2010/008381
§ 371 (c)(1),
(2), (4) Date: May 24, 2012

(87) PCT Pub. No.: WO2011/065759
PCT Pub. Date: Jun. 3, 2011

(65) Prior Publication Data
US 2012/0274043 A1    Nov. 1, 2012

(30) Foreign Application Priority Data
Nov. 26, 2009    (KR) .......................... 10-2009-0115115

(51) Int. Cl.
*B62J 9/00*    (2006.01)
(52) U.S. Cl.
USPC .................................. 280/288.4; 297/215.13
(58) Field of Classification Search
USPC .................................. 280/288.4; 297/215.13
See application file for complete search history.

(56) References Cited

U.S. PATENT DOCUMENTS

| | | | | |
|---|---|---|---|---|
| 6,050,585 A | * | 4/2000 | Rai | 280/288.4 |
| 7,909,348 B2 | * | 3/2011 | Klieber | 280/288.4 |
| 8,016,349 B2 | * | 9/2011 | Mouri et al. | 297/215.13 |
| 8,191,964 B2 | * | 6/2012 | Hsu | 297/215.13 |
| 8,308,124 B2 | * | 11/2012 | Hsu | 248/599 |

FOREIGN PATENT DOCUMENTS

| | | |
|---|---|---|
| JP | 11-255162 | 9/1999 |
| JP | 2005-231567 | 9/2005 |
| JP | 2005-262900 | 9/2005 |
| KR | 1020040034385 A | 4/2004 |

OTHER PUBLICATIONS

"International Application No. PCT/KR2010/008381, International Search Report mailed Jul. 8, 2011", 9 pgs.

* cited by examiner

*Primary Examiner* — Tashiana Adams
*Assistant Examiner* — Marlon Arce
(74) *Attorney, Agent, or Firm* — Schwegman, Lundberg & Woessner, P.A.

(57) ABSTRACT

Disclosed herein is an apparatus for adjusting the height of a saddle for a bicycle. The apparatus includes a saddle lift device that moves the saddle upwards or downwards to adjust the height of the saddle, and a controller that controls the operation of the saddle lift device. In the present invention, even when a bicycle is traveling, the height of the saddle can be automatically adjusted to an appropriate height depending on the travel conditions, thus enhancing the safety of a rider and providing convenience. Moreover, the present invention stores information about the body type of the rider and automatically adjusts the height of the saddle to a height suitable for the body type, thus making it markedly easy to adjust the height of the saddle, and enhancing the safety of the rider while riding the bicycle.

5 Claims, 5 Drawing Sheets

APPARATUS FOR ADJUSTING THE HEIGHT OF A SADDLE FOR A BICYCLE

PRIORITY CLAIM TO RELATED APPLICATIONS

This application is a national stage application under 35 U.S.C. §371 of PCT/KR2010/008381, filed Nov. 25, 2010, and published as WO 2011/065759 A2 on Jun. 3, 2011, which claims priority to Korean Application No. 10-2009-0115115, filed Nov. 26, 2009, which applications and publication are incorporated by reference as if reproduced herein and made a part hereof in their entirety, and the benefit of priority of each of which is claimed herein.

TECHNICAL FIELD

The present invention relates to an apparatus for automatically adjusting the height of a saddle to suit the body type of a rider.

BACKGROUND ART

Generally, bicycles are used for a variety of purposes, e.g., leisure, sports, means of transportation, etc.

Particularly, in recent years, as the number of people who use bicycles for commuting increases, and environmental improvement of residential areas is resulting in an increase of the number of bike lanes or parks which permit bicycle traffic, the distribution rate of bicycles has been on the rise.

Bicycles typically include a bicycle frame provided with a saddle, a front wheel, a rear wheel, pedals provided in the bicycle frame to allow a rider to push them with his or her feet to rotate them, sprockets respectively provided on the pedals and the rear wheel, and a chain that connects the sprockets to each other to transmit the rotating force from the pedal to the rear wheel.

If the rider sits on the saddle and pedals, the rotating force of the pedals, in other words, the drive force, is transmitted to the rear wheel by the chain, thus propelling the bicycle.

The height of the saddle has been able to be adjusted manually.

However, the manual method of adjusting the height of the saddle requires a lot of force or use of a separate tool when handling related elements, thus inconveniencing the user. Further, it takes a lot of time, and it is impossible to adjust the height of the saddle when the bicycle is traveling.

DISCLOSURE

Technical Problem

Accordingly, the present invention has been made keeping in mind the above problems occurring in the prior art, and an object of the present invention is to provide an apparatus which not only can automatically adjust the height of a saddle of a bicycle to suit the body type of a rider but can also automatically adjust the height of the saddle even when the bicycle is in motion.

Technical Solution

In order to accomplish the above object, the present invention provides an apparatus for adjusting a height of a saddle for a bicycle, the apparatus including: a saddle lift device moving the saddle upwards or downwards, thus adjusting the height of the saddle; and a controller controlling operation of the saddle lift device.

The saddle lift device may include: a motor generating a rotating force; a lift body coupled to the saddle of the bicycle, the lift body being moved upwards or downwards; an actuating member receiving the rotating force from the motor and moving the lift body upwards or downwards; and a rotating force transmission unit transmitting the rotating force from the motor to the actuating member.

Advantageous Effects

According to the present invention, even when a bicycle is in motion, the height of a saddle can be automatically adjusted to an appropriate height depending on travel conditions, thus enhancing the safety of a rider, and provide convenience.

Moreover, the present invention stores information about the body type of the rider and automatically adjusts the height of the saddle to a height suitable for the body type, thus making it noticeably easy to adjust the height of the saddle, and enhancing the safety of the rider while riding the bicycle.

| | |
|---|---|
| 1: screw | 2: threaded part |
| 3: first lubrication member | 4: second lubrication member |
| 30: main control unit | 31: power supply |
| 33: height sensor | 34: speed sensor |
| 200: saddle lift device | 300: controller |

BEST MODE

Hereinafter, a preferred embodiment of the present invention will be described in detail with reference to the attached drawings.

Figure 1:
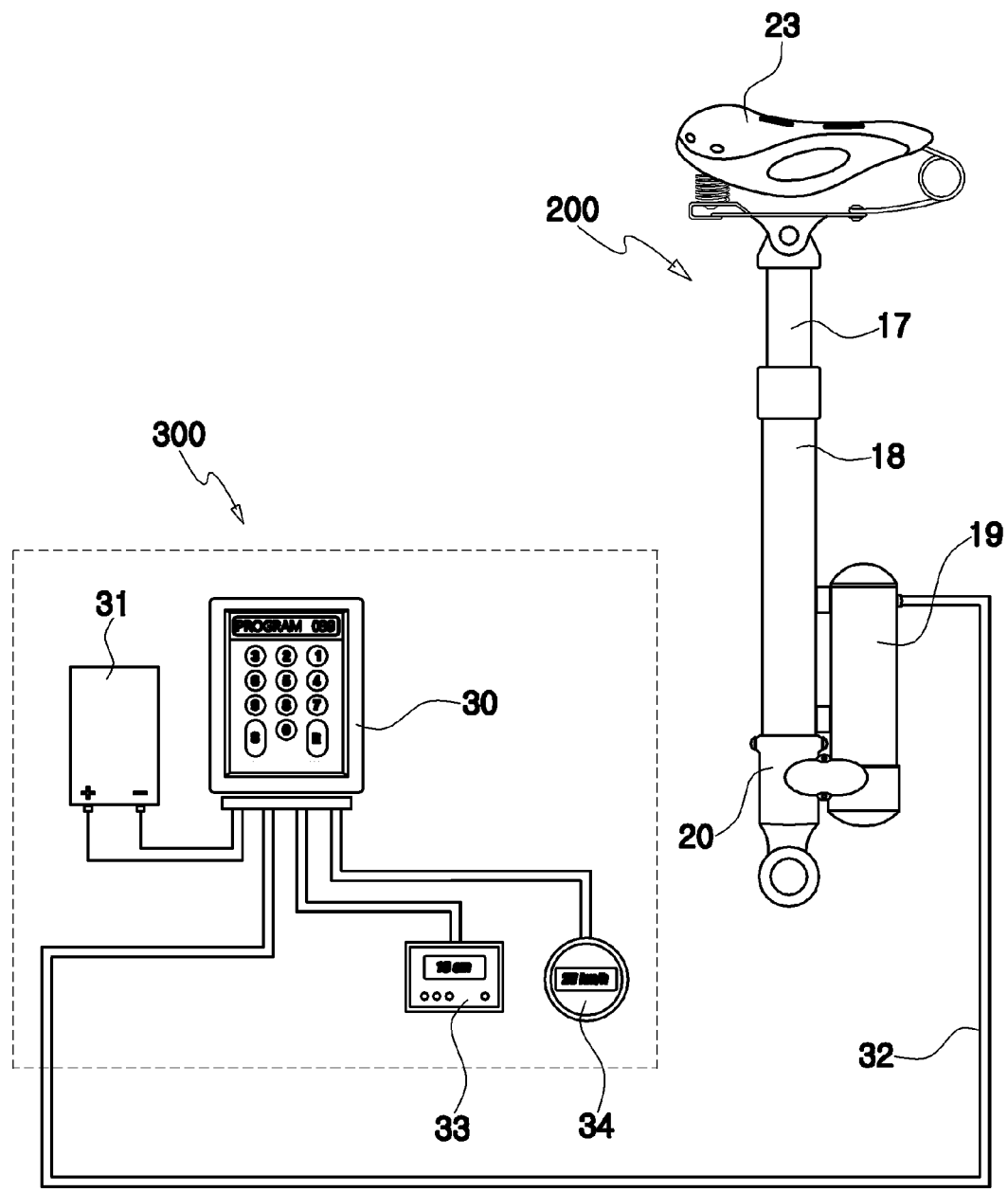
FIG. 1 is a schematic view illustrating the structure of the present invention.

As shown in FIG. 1, an apparatus for adjusting the height of a saddle for a bicycle according to the present invention includes a saddle lift device 200 which is connected to the saddle 23 of the bicycle to adjust the height of the saddle 23, and a controller 300 which controls the operation of the saddle lift device 200.

The controller 300 includes a main control unit 30. The main control unit 30 includes an input unit allowing a rider to manipulate it, stores information about the body type of the rider, and operates the saddle lift device 200 depending on the stored information, thus adjusting the height of the saddle 23.

The controller 300 further includes a power supply 31 which supplies power to the saddle lift device 200.

Preferably, the controller 300 further includes a height sensor 33 which senses the height of the saddle 23 that is adjusted by the saddle lift device 200, and a speed sensor 34 which detects the speed at which the bicycle is traveling.

The main control unit 30 stores information about the body type of the rider in such a way the rider directly inputs information about his/her body type using the input unit or selects the appropriate kind of body type from different kinds of body types that have been stored. The main control unit 30 operates the saddle lift device 200 depending on the stored body type information not only just after the rider sits on the saddle 23 but also while the bicycle is in motion, thus adjusting the height of the saddle 23 to a height appropriate to the travel conditions for the rider using the height sensor 33 and the speed sensor 34. Furthermore, the main control unit 30 is connected to the power supply 31, the height sensor 33, the speed sensor 34 and a motor 13 by electrical wires 32.

For instance, when the rider sits on the saddle 23 of the bicycle and begins to ride the bicycle, the height of the saddle 23 is adjusted to a height appropriate to the body type of the rider so that the feet of the rider can touch the ground. As the speed of the bicycle gradually increases, the height of the saddle 23 is increased, thus spacing the feet of the rider apart from the ground to a predetermined distance so that the height of the saddle 23 is suitable for the rider to pedal the bicycle. If the bicycle that was in motion stops for a while, the height of the saddle 23 is dropped to allow the rider to reach the ground without inclining the bicycle frame 100. Thereby, the rider stopping the bicycle can be stable.

Figure 2:
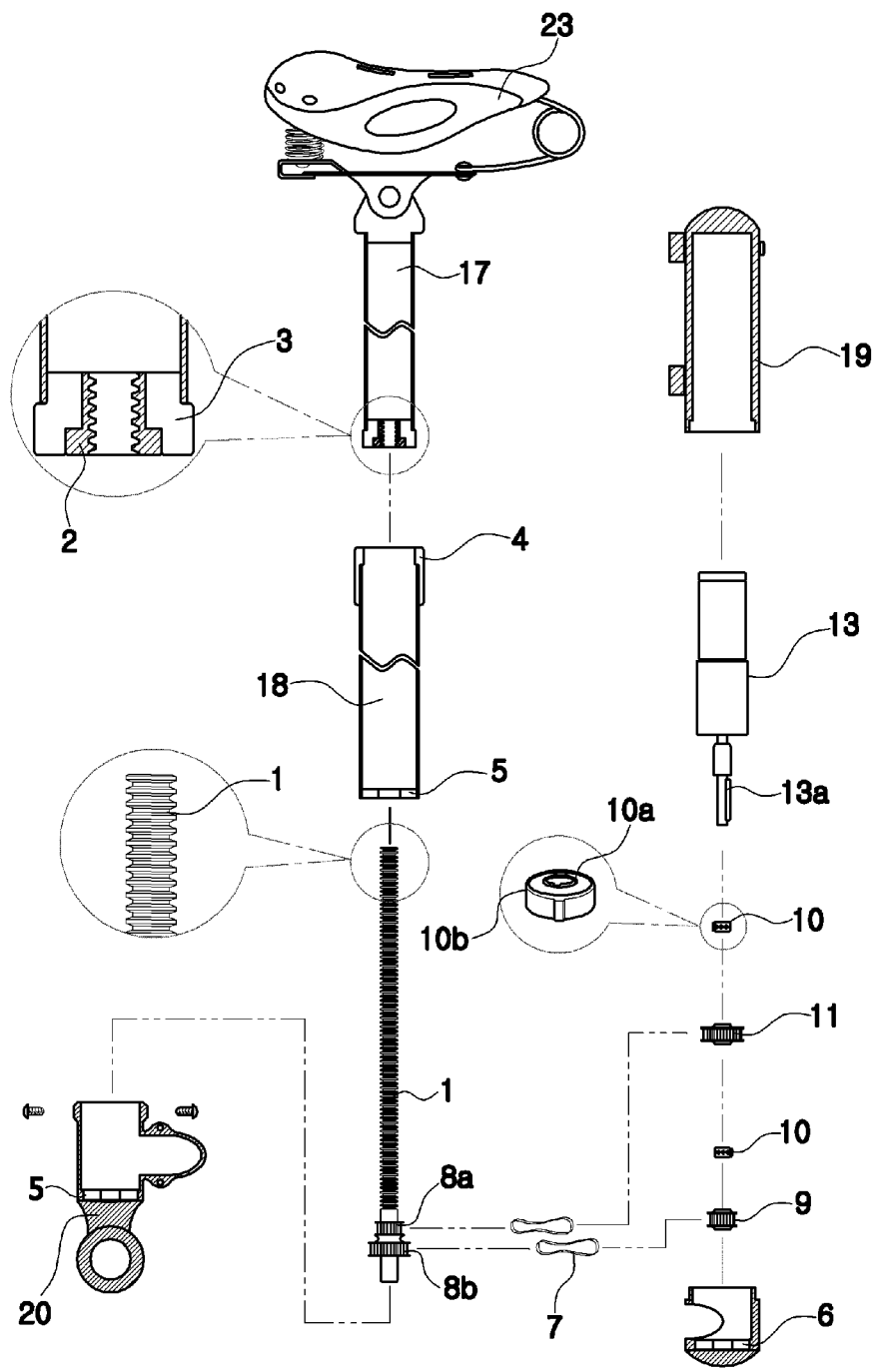
FIG. 2 is an exploded perspective view illustrating an embodiment of the present invention.

Referring to FIG. 2, the saddle lift device 200 includes the motor 13 which generates rotating force; a lift body 17 which is coupled to the saddle 23 of the bicycle and is moved upwards or downwards; an actuating member which receives the rotating force from the motor 13 and moves the lift body 17 upwards or downwards using the rotating force; and a rotating force transmission unit which transmits the rotating force from the motor 13 to the actuating member.

The actuating member includes a screw 1 which is disposed upright below the saddle 23 of the bicycle and is threadedly coupled to the lift body 17.

The present invention further includes a base body unit which is fixed to the bicycle frame 100. The screw 1 is placed upright in the base body unit, and the lift body 17 is coupled to the base body unit so as to be movable upwards or downwards. The base body unit has therein a screw support bearing 5 by which the screw 1 is rotatably coupled to the base body unit. Further, the base body unit also includes an upper body part 18 to which the lift body 17 is movably coupled, and a lower body part 20 which is provided with the rotating force transmission unit disposed therein and is separably coupled to the upper body part 18. As such, the base body unit is configured such that the upper body part 18 and the lower body part 20 are separably assembled with each other, thus facilitating the maintenance of both the upper and lower body parts 18 and 20.

Preferably, the present invention further includes a lubrication unit which is provided between the base body unit and the lift body 17 to smoothen out movement of the lift body 17. The lift body 17 has in a lower end thereof a threaded part 2 to which the screw 1 is threadedly coupled.

The lubrication unit includes a first lubrication member 3 which protrudes from the circumferential outer surface of the lower part of the lift body 17 and is put into contact with the circumferential inner surface of the base body unit, and a second lubrication member 4 which protrudes from the circumferential inner surface of an upper part of the base body unit and which is put into contact with the circumferential outer surface of the lift body 17.

The first lubrication member 3 and the second lubrication member 4 function not only to support the lift body 17 when the lift body 17 moves up or down but also to reduce contact friction with the base body unit to make it possible for the lift body 17 to move up and down smoothly.

The motor 13 is installed in a motor casing 19 which is provided at a position spaced apart from the base body unit by a predetermined distance. In this embodiment, the motor casing 19 is preferably provided with a shaft support bearing 6 that is coupled to the end of a motor shaft 13a of the motor 13 to support the rotation of the motor shaft 13a.

The rotating force transmission unit includes a plurality of power transmitting members which transmit power at different gear ratios. The power transmitting members are configured such that when the saddle moves downwards, the power is transmitted from a larger gear to a smaller gear, and if the saddle moves upwards, the power is transmitted from a smaller gear to a larger gear.

The rotating force transmission unit includes a first power transmitting member 11 which is mounted to the motor shaft 13a of the motor 13 and rotates integrally with the motor shaft 13a in a direction corresponding to the direction in which the lift body 17 moves when moved downwards while being prevented from rotating in the reverse direction; a second power transmitting member 9 which has a diameter smaller than that of the first power transmitting member 11 and which is mounted to the motor shaft 13a and rotates integrally with the motor shaft 13a in a direction corresponding to the direction in which the lift body 17 moves when moved upwards while being prevented from rotating in the reverse direction; a third power transmitting member 8a which has a diameter smaller than that of the first power transmitting member 11 and which is mounted to the screw 1 and is rotated by the rotating force transmitted from the first power transmitting member 11; and a fourth power transmitting member 8b which has a diameter larger than that of the second power transmitting member 9, and which is mounted to the screw 1 and is rotated by the rotating force transmitted from the second power transmitting member 9.

The first power transmitting member 11 is provided with a one-way bearing 10 which is coupled to the motor shaft 13a. The one-way bearing 10 allows the first power transmitting member 11 to rotate integrally with the motor shaft 13a in only one direction and to rotate the motor shaft 13a without rotating the transmitting member 11 when rotating in the reverse direction.

The second power transmitting member 9 is provided with another one-way bearing 10 which is coupled to the motor shaft 13a. This one-way bearing 10 allows the second power transmitting member 9 to rotate integrally with the motor shaft 13a only in a direction opposite to the direction in which the first power transmitting member 11 rotates and allows the motor shaft 13a to rotate without moving the power transmitting member 9 when rotating in the reverse direction.

Each one-way bearing 10 includes an inner ring 10a which is coupled to the motor shaft 13a, and an outer ring 10b which is provided around the inner ring 10a and is coupled to the first power transmitting member 11 or the second power transmitting member 9. The outer ring 10b rotates integrally with the inner ring 10a in one direction while rotating separately from the inner ring 10a in the reverse direction. The one-way bearing 10 mounted in the first power transmitting member 11 and the one-way bearing 10 mounted in the second power transmitting member 9 are oriented in opposite directions.

Belts may be used to transmit the rotating force from the first power transmitting member 11 and the second power transmitting member 9 to the third power transmitting member 8a and the fourth power transmitting member 8b. Alternatively, a gear mechanism in which the first power transmitting member 11 and the third power transmitting member 8a respectively engage with the second power transmitting member 9 and the fourth power transmitting member 8b may be used.

When the motor shaft 13a of the motor 13 rotates so that the screw 1 rotates in the direction in which the lift body 17 is moved downwards, the first power transmitting member 11 rotates integrally with the motor shaft 13a and transmits the rotating force to the third power transmitting member 8a, thus rotating the screw 1 in the direction in which the lift body 17 is moved downwards.

In this case, the inner ring 10a of the one-way bearing 10 that pertains to the second power transmitting member 9 idles, preventing the second power transmitting member 9 from rotating.

Figure 3:
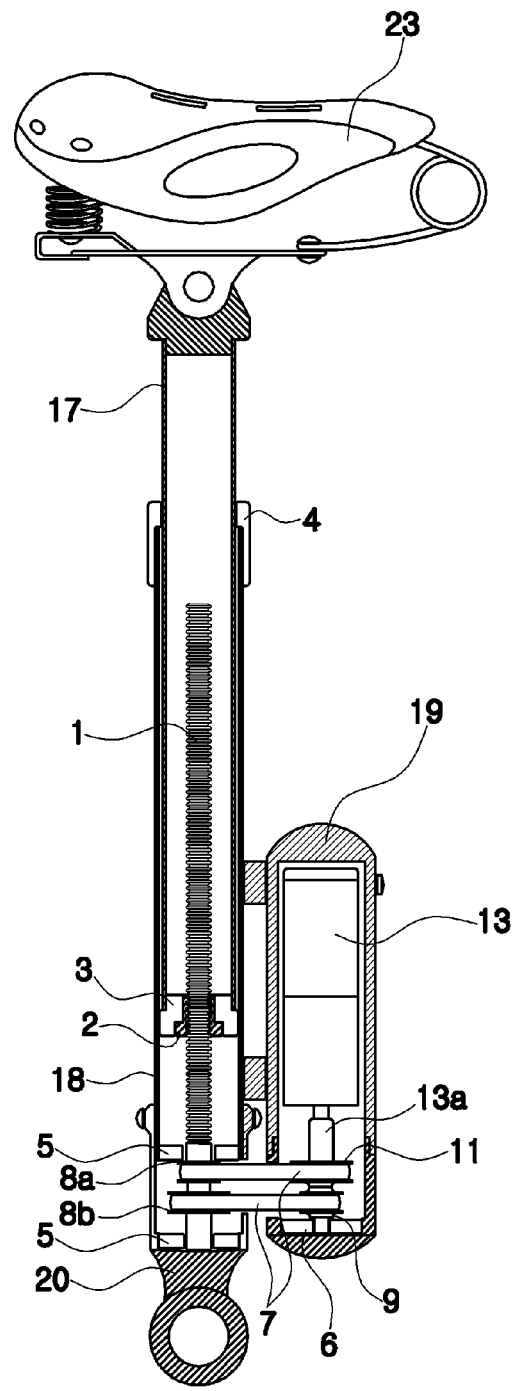
FIGS. 3 and 4 are views illustrating the operation of the present invention.

As can be understood with reference to FIG. 3, the above-stated rotation of the screw 1 moves the lift body 17 downwards.

Figure 4:
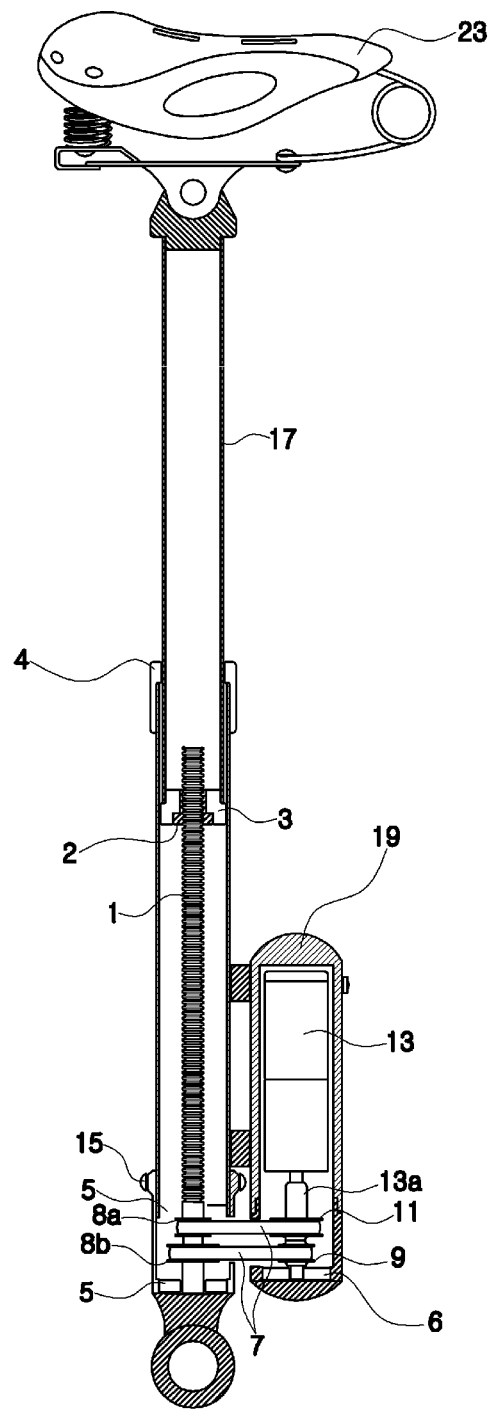

In an opposing manner, when the motor shaft 13a of the motor 13 rotates so that the screw 1 rotates in the direction in which the lift body 17 is moved upwards, the second power transmitting member 9 rotates integrally with the motor shaft 13a and transmits the rotating force to the fourth power transmitting member 8b, thus rotating the screw 1 in the direction in which the lift body 17 is moved upwards. In this case, the inner ring 10a of the one-way bearing 10 that pertains to the first power transmitting member 11 idles, preventing the first power transmitting member 11 from rotating. As shown in FIG. 4, the lift body 17 is moved upwards by such rotation of the screw 1.

The rotating force transmission unit is configured such that during the descent operation in which a load applied thereto is comparatively small, the rotating force is transmitted from the first power transmitting member 11 of which the diameter is large to the third power transmitting member 8a of which the diameter is small, whereby the rotating speed of the screw 1 can be increased, thus rapidly moving the saddle 23 downwards.

On the other hand, during the operation of moving up, the rotating force is transmitted from the second power transmitting member 9 which has a small diameter to the fourth power transmitting member 8b which has a large diameter. Thereby, a comparatively large rotating force can be provided to the screw 1 so that the saddle 23 on which the weight of the rider is loaded can move upwards smoothly.

Figure 5:
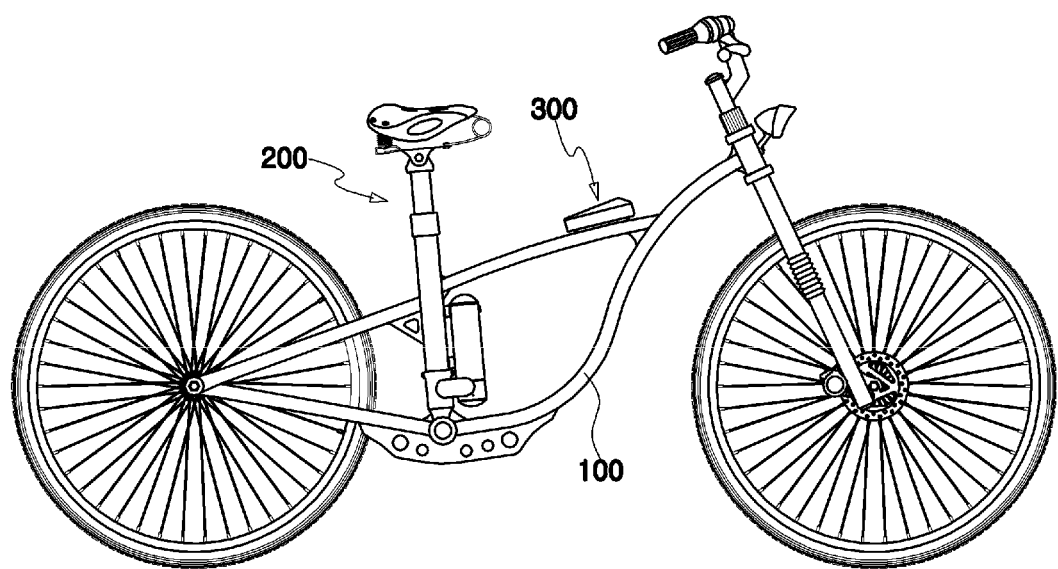
FIG. 5 is a side view showing a bicycle provided with the present invention.

Referring to FIG. 5, the present invention is installed on the bicycle frame 100 and operates the saddle lift device 200 differently depending on the information about the body type of the rider that has been stored in the main control unit 30, thus automatically adjusting the height of the saddle 23.

Further, the present invention can adjust the height of the saddle 23 in such a way that it is smoothly moved upwards and rapidly moves downwards so that, for example, if the rider suddenly brakes and reduces the speed of the bicycle, the saddle 23 can be rapidly moved downwards, thereby increasing the safety of the rider.

Although the preferred embodiment of the present invention has been disclosed for illustrative purposes, the present invention is not limited to the embodiment, and various modifications, additions and substitutions are possible, without departing from the scope and spirit of the invention.

The invention claimed is:

1. An apparatus for adjusting a height of a saddle for a bicycle, the apparatus comprising:
a saddle lift device moving the saddle upwards or downwards, thus adjusting the height of the saddle; and
a controller controlling operation of the saddle lift device, wherein the saddle lift device comprises:
a motor generating a rotating force;
a lift body coupled to the saddle of the bicycle, the lift body being moved upwards or downwards;
an actuating member receiving the rotating force from the motor and moving the lift body upwards or downwards; and
a rotating force transmission unit transmitting the rotating force from the motor to the actuating member,
wherein the actuating member comprises a screw disposed upright below the saddle of the bicycle, the screw being threadedly coupled to the lift body, and
the rotating force transmission unit comprises:
a first power transmitting member mounted to a motor shaft of the motor, the first power transmitting member rotating integrally with the motor shaft in a direction corresponding to a direction in which the lift body is moved downwards while being prevented from rotating in a reverse direction;
a second power transmitting member having a diameter smaller than a diameter of the first power transmitting member, the second power transmitting member being mounted to the motor shaft and rotating integrally with the motor shaft in a direction corresponding to a direction in which the lift body is moved upwards while being prevented from rotating in a reverse direction;
a third power transmitting member having a diameter smaller than the diameter of the first power transmitting member, the third power transmitting member being mounted to the screw and being rotated by the rotating force transmitted thereto from the first power transmitting member; and
a fourth power transmitting member having a diameter larger than the diameter of the second power transmitting member, the fourth power transmitting member being mounted to the screw and being rotated by the rotating force transmitted thereto from the second power transmitting member.

2. The apparatus as set forth in claim 1, further comprising:
a base body unit mounted to a bicycle frame, with the actuating member disposed in the base body unit, and the lift body coupled to the base body unit so as to be movable upwards and downwards; and
a lubrication unit provided between the base body unit and the lift body to make the movement of the lift body smooth.

3. The apparatus as set forth in claim 2, wherein the lubrication unit comprises:
a first lubrication member protruding from a circumferential outer surface of a lower part of the lift body, the first lubrication member being put into contact with a circumferential inner surface of the base body unit; and
a second lubrication member protruding from a circumferential inner surface of an upper part of the base body unit, the second lubrication member being put into contact with the circumferential outer surface of the lift body.

4. The apparatus as set forth in claim 1, wherein the controller comprises a main control unit provided with an input unit to be manipulated by a rider, the main control unit storing information about a body type of the rider and operating the saddle lift device depending on the stored information to adjust the height of the saddle.

5. The apparatus as set forth in claim 4, wherein the controller further comprises:
a height sensor sensing the height of the saddle that is adjusted by the saddle lift device; and
a speed sensor sensing a speed at which the bicycle is traveling.

* * * * *